Sept. 18, 1956  G. BERGSON  2,763,161
BACKLASH COMPENSATING MECHANISM
Filed June 14, 1955
Fig.1.
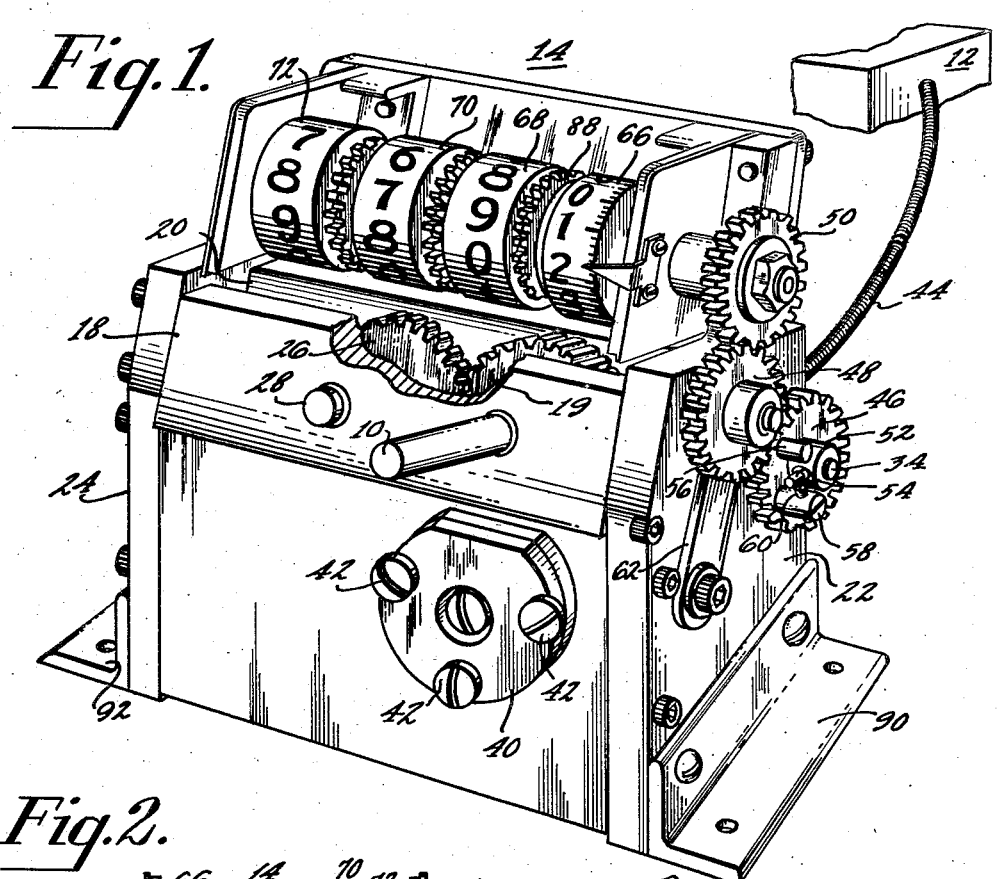
Fig.2.
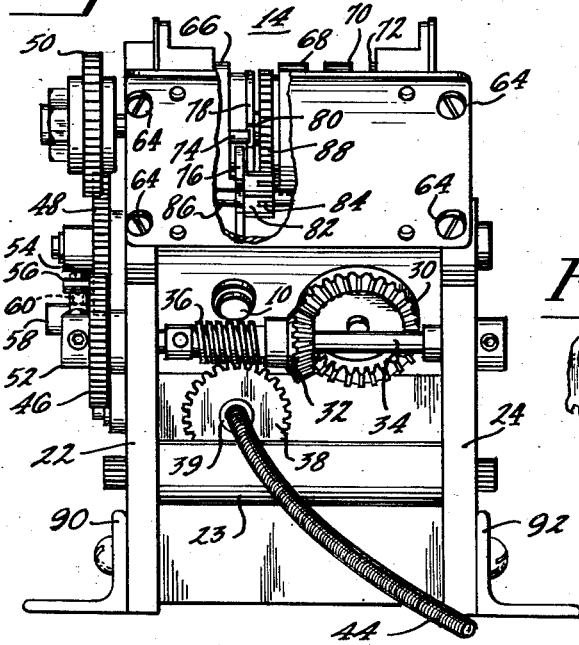
Fig.3.
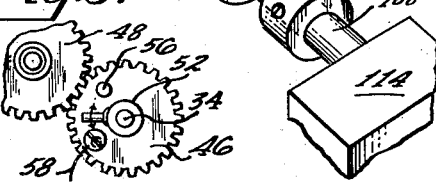
Fig.4.
INVENTOR.
Gustav Bergson
BY
Eugene M. Whitacre
AGENT.

United States Patent Office 2,763,161
Patented Sept. 18, 1956

2,763,161

BACKLASH COMPENSATING MECHANISM

Gustav Bergson, Philadelphia, Pa.

Application June 14, 1955, Serial No. 515,474

10 Claims. (Cl. 74—409)

This invention relates to mechanical driving mechanisms of the type wherein separate driven members are simultaneously driven by a single driving shaft through independent mechanical driving systems such as gear trains. More particularly, this invention relates to backlash compensating systems for such driving mechanisms wherein the different driven members may be maintained in an exact predetermined tracking relation for both directions of rotation of the drive shaft.

In driving mechanisms wherein the member to be driven is connected with the control shaft through a gear train or the like, there is a certain amount of looseness or play in the driving system due to the individual gear tolerances. This looseness results in a certain amount of lost motion between the control shaft and the driven member, which is known as backlash. In other words, the control shaft must be rotated a predetermined amount to take up the slack due to the gear tolerances before the driven member is actually moved. It is often desirable or necessary that a second driven member such as an indicator assembly be simultaneously driven by the control shaft. In such a case, if the backlash in the driving system to the second driven member is different from the backlash in the driving system to the first driven member, the differences in the play or backlash in the respective gear trains may result in tracking error between the two driven members when the direction of movement of the control shaft is reversed. The term "tracking" as used herein is used to connote the point by point relation of the first driven member to the second as both are moved by the control shaft.

For example, in certain types of precision apparatus it is often necessary that the indicator assembly display exactly the setting of an element to be controlled, or some quantity such as frequency or the like which is a function of the first driven member setting. If the indicator assembly is controlled by a mechanical driving system which has a different amount of backlash than is present in the driving system to the element to be controlled, the differences in the backlash of the respective drive systems may introduce intolerable error in the indicator reading under certain conditions. If the indicator assembly is adjusted to precisely indicate the setting of the driven element when the control shaft is rotated in one direction, an error will be introduced upon reversal of the direction of rotation of the control shaft. This is because the slack or backlash in the driving systems are not equal and the slack in one of the driving systems is taken up more quickly than in the other. Hence if there is less backlash introduced in the driving system to the indicator assembly than in the driving system to the member to be controlled, the indicator assembly will be driven, and the indicated reading will change before the element to be controlled is actually moved.

Ordinarily this problem is met in precision apparatus by the use of very small tolerance parts, and precision techniques to reduce the backlash in the respective driving systems to as small an amount as possible. However, such methods are not entirely satisfactory since the backlash error is not entirely reduced by these methods, and cost of making such precision apparatus is high.

It is an object of this invention to provide an improved mechanical driving system of the type described which may be easily manufactured at low cost in which the tracking error between the two driven members is eliminated.

It is another object of this invention to provide an improved backlash compensating mechanism for effecting an exact tracking relationship between separate driven members which are controlled by a common control element.

It is a further object of this invention to provide an improved mechanical system for indicating exactly the relative position or setting of a driven member irrespective of the direction of motion of the control means.

It is a still further object of this invention to provide an improved mechanical driving system of the type having a common rotatable drive shaft, which is adapted to simultaneously drive two driven members through respective driving mechanisms having different backlash characteristics wherein the backlash in the two driving systems is balanced out so that the two drive members will maintain a precise tracking relation upon reversal of rotation of the drive shaft.

In accordance with the invention, a rotatable control shaft is adapted to simultaneously control separate driven elements through respective mechanical driving systems. The mechanical driving systems referred to may comprise independent gear trains or the respective driven portions of a differential gearing system or the like. The driving system which has the least amount of play or backlash includes means for introducing enough backlash in that driving system so that the backlash in the two systems is equal. Thus an exact tracking relationship will be maintained between the driven members regardless of the direction of rotation of the control shaft. The invention is also applicable for equalizing the backlash between the control shaft and the driven members when there are more than two driven members. As a further feature of the invention, the backlash introducing means may be made adjustable to facilitate in the balancing out of the differences in the backlash in the mechanical systems.

The novel features which are considered characteristic of this invention are set forth with particularity in the appended claims. The invention itself, however, both as to its organization and method of operation, as well as additional objects and advantages thereof will best be understood from the following description when read in connection with the accompanying drawings, in which:

Figure 1 is a perspective view, partly broken way, of a mechanical driving and indicating device embodying the backlash compensating mechanisms of the invention;

Figure 2 is a rear elevational view partly broken away, and of reduced horizontal scale, of the mechanical driving and indicating device shown in Figure 1;

Figure 3 is a fragmentary view of a portion of a mechanical driving system illustrating a further embodiment of the invention; and Figure 4 is a view illustrating another modification of the invention.

Referring now to the drawings wherein like reference numerals are used to indicate like elements in the respective figures thereof, a rotatable control shaft 10 is connected through mechanical drive systems to simultaneously control a desired driven member 12 and a suitable indicating system such as a counter 14, the purpose of the counter 14 being to accurately indicate the setting of the controlled element 12. The control shaft 10, which may be manually rotated, is journalled for rotation in bearings formed by a front plate 18 of the drive unit, and a second plate 20. The second plate 20 is supported by a pair of side walls 22 and 24. The gear 19 which is fastened on the control shaft 10 between the front plate 18 and the second plate 20, meshes with a second gear 26. The gear 26 is mounted on a shaft 28 which is also journalled for rotation between the front plate 18 and the second plate 20.

A portion of the shaft 28 extends through the second plate 20 and supports a bevel gear 30 on the reverse side of the second plate 20 as is shown in Figure 2.

The bevel gear 30 is in driving relation with a second bevel gear 32 which is fastened on a shaft 34. The shaft 34 extends transversely between the side walls 22 and 24 and is journalled for rotation in bearings supported by the side walls. Also fastened on the shaft 34 between the side walls 22 and 24 is a worm gear 36 which is in driving engagement with the driving gear 38 for the drive member 12 which is to be controlled. A suitable spacer 23 extends between the side walls 22 and 24 and is suitably fastened thereto.

The driving gear 32 is mounted on a shaft 39 which is rotatably supported by a bearing member 40, which is suitably fastened to the rear side of the front plate 18 by the screws 42 and extends rearwardly under the second plate 20. A flexible coupling member 44 is suitably fastened to the driving gear shaft 39 for transmitting the rotary motion of the driving gear to the driven member 12. The driven member may include additional mechanical drive means such as gear trains or the like for controlling the movement thereof.

The driving mechanism for transmitting the motion of the transversely extending shaft 34 to the counter mechanism 14 includes the three gears 46, 48 and 50 illustrated on the right hand side of the drive unit as shown in Figure 1. The gear 46 is rotatably supported by but not fastened to an end of the shaft 34 which extends through the side wall 22. A collar 52 is fastened on the end of the shaft 34 as a retaining means for the gear 46.

A radially extending finger 54 is suitably fastened to the collar 52, and is positioned between a pair of axially extending studs 56 and 58 on the face of the gear 46. An adjusting screw 60 is provided in a tapped hole in the side of the stud 58, and is positioned to engage the driving finger 54. By adjustment of the adjusting screw 60, the travel of the shaft 34 before the driving finger 54 causes rotation of the gear 46 may be selectively varied. Alternatively, as shown in Figure 3, the stud 58 may comprise the eccentric head of a screw which can be rotated to adjust the travel of the radially extending driving finger 54.

Rotational motion of the gear 46 is transmitted through the idler gear 48 to the counter driving gear 50. The idler gear is fastened to a shaft which is journalled in a bearing supported by an arm 62 which is pivotally mounted on the side wall 22. This construction permits the idler gear to be easily disengaged from the counter drive gear so the counter 14 can be pre-set to a desired reading in conformity with the setting of the driven member 12.

The counter assembly 14 is suitably fastened to the end plates 20 and 22 by the screws 64, and comprises a conventional step by step counter comprising four cylindrical rollers 66, 68, 70 and 72 having suitable indicia on the surfaces thereof. Ten revolutions of the cylindrical roller 66 produces one revolution of the roller 68 in ten separate steps. Likewise each revolution of the cylindrical roller 68 produces one tenth of a revolution steps of the roller 70, etc.

The cylindrical roller 66 is mounted on the same shaft as the counter drive gear 50 and is continuously rotatable therewith. The motion from the cylindrical roller 66 is transmitted to the cylindrical roller 68 by a Geneva gear system. A stud 74 which is mounted on one edge of the roller 66 engages the teeth of a Geneva gear 76 once for each revolution of the member 66. A circular cam member 78 having a notch 80 on the periphery thereof adjacent the stud 74 is also fastened for rotation with the member 66.

The Geneva gear 76 assembly includes a double gear having an inner portion 82 and an outer portion 84. This assembly is fastened to a transverse shaft 86 which is supported by the counter assembly housing. The cam member 78 is positioned so that Geneva gear 76 assembly cannot rotate until the notch is over one of the teeth of the gear 82. At this time the stud 74 is also rotatably driving the Geneva gear 76. A gear 88 which is fastened to the roller 68 is rotated by the gear 84, so that the roller 68 advances one step, or one tenth of a revolution. Similar advancing mechanism is mounted between the rollers 68 and 70, and 70 and 72.

The drive unit is provided with a pair of mounting brackets 90 and 92 which have apertures for receiving bolts or other suitable means for fastening the unit to a desired chassis.

Referring now to the operation of the mechanism described above, rotational movement of the control shaft 10 to control the driven member 12 is transmitted through the gear train including the gears 16, 26, 30, 32, 36 and 38. The counter 14, which indicates the setting of the driven member 12, is also driven through the last named train of gears except for the driving gear 38, but additionally through the gears 46, 48 and 50. Thus the lost motion or backlash in the gear trains 16, 26, 30, 32 and 36 will be exactly the same for the counter 14 as for the driven member 12 and need not be compensated for. However, the lost motion starting with that between the worm gear 36 and the driving gear 38 and including any additional lost motion due to the flexing of the coupling member 44 or looseness in any additional mechanical driving elements between the coupling member 44 and the driven member 12 is not present in the drive system to the counter 14. This lost motion is partially compensated for by any looseness or play in the gears 46, 48 and 50 which move the counter 14. It is the purpose of this invention to provide means to balance out the uncompensated backlash of the first mentioned gear train.

In accordance with the invention, the radially extending finger 54 which is fastened to the shaft 34, and drives the gear 46 by engagement with either of the axially extending abutment members or studs 56 and 58, is able to move far enough between two studs to equalize the backlash in the two mechanical drive systems, in other words the play of the finger 54 between the studs 56 and 58 compensates for the unbalanced out portion of the backlash in the mechanical driving system of the driven member 12. Assuming that the counter 14 accurately displays the setting of the driven member 12 as the control shaft is rotated in one direction, upon reversal of rotation of the control member the slack must be taken up in the mechanical gear train to the driven member 12 before that member is driven. As this slack is being taken up, the finger 54 moves from driving one of the axial studs on the gear 46 to the other. In the meantime the gear 46 does not move as the shaft 34 rotates in the hub thereof. The adjusting screw 60 is set so that the driving gear 50 begins to drive the counter 14 at the same instant that the backlash is taken up in the mechanical drive system to the drive member 12.

Referring now to Figure 4, wherein a further modification of the invention is illustrated which includes a rotatable control shaft 94 having a driving gear 96, and a collar 98 suitably fastened thereon. The driving gear 94 engages a gear 100 which is connected with a first drive member 102. The first drive member 102 may include additional driving elements which introduce backlash.

The collar 98 includes a pair of radially extending studs 104 and 106, the stud 106 being provided with an adjusting screw 107. One end of a shaft 108 extends into the collar 98, but is rotatable therein, and the collar forms a bearing in which the shaft 108 may be rotated through a limited angle. A radially extending finger 110 which extends from the shaft 108 is bent to project between the studs 104 and 106, so that the shaft 108 is driven when one of the studs 104 or 106 bears against the finger 110. The shaft 108 drives the second driven member 114.

It may be assumed that the mechanical driving system to the first drive member 102 has a greater amount of backlash than the driving system to the second driven member 114. The amount of rotation of the collar 98 and the studs 104 and 106 which are mounted thereon before the finger 110 is engaged for driving introduces the required amount of play to equalize the backlash in the two driving systems so that the two driven mmebers 102 and 114 will be maintained in exact tracking relation for both directions of rotation of the control shaft.

The backlash compensating system described provides a simple and foolproof arrangement for effecting exact tracking relationship between different driven elements having respective mechanical drive systems for both directions of rotation of the control shaft. A backlash compensating system in accordance with the invention enables the exact indication of the setting of a controlled member despite differences in the backlash characteristic in the mechanical driving systems between the control shaft and the driven member, and between the control shaft and the indicator.

What is claimed is:

1. A backlash compensating mechanism comprising in combination, a driven member adjustable to different settings, control means for controlling the setting of said driven member, indicating means for indicating the setting of said driven member, a first and a second mechanical drive system, said first drive system connected between said control means and said driven member, said second drive system connected between said control means and said indicating means whereby said control means simultaneously controls said driven member and said indicating means, means providing a driven shaft in said second drive and a gear rotatably supported by said shaft, a member radially extending from said shaft, a pair of abutment surfaces on said gear positioned for engagement with said radially extending member, and means adjusting the travel of said radially extending member between said abutment surfaces for balancing the backlash in said first and second drive systems.

2. A backlash compensating mechanism comprising in combination, a driven member adjustable to different settings, control means for controlling the setting of said driven member, indicating means for indicating the setting of said driven member, a first and a second mechanical drive system, said first drive system connected between said control means and said driven member, said second drive system connected between said control means and said indicating means whereby said control means simultaneously controls said driven member and said indicating means, means providing a driven shaft in said second drive, a pair of studs mounted in spaced relation on the face of said gear, a finger radially extending from and fastened to said shaft and extending between said studs whereby rotation of said shaft causes said finger to bear against one of said studs and drive said gear, an adjustable member extending from one of said studs positioned for engagement with said finger for balancing the backlash of said first and second drive systems.

3. A backlash compensating mechanism comprising in combination, a driven member adjustable to different settings, control means for controlling the setting of said driven member, indicating means for indicating the setting of said driven member, a first and second mechanical drive system, said first drive system connected between said control means and said driven member, said second drive system connected between said control means and said indicating means whereby said control means simultaneously controls said driven member and said indicating means, means providing a driven shaft in said second drive, a pair of studs mounted in spaced relation on the face of said gear, one of said studs comprising the eccentric head of a screw, a finger radially extending from and fastened to said shaft and extending between said studs whereby rotation of said shaft causes said finger to bear against one of said studs and drive said gear, the travel of said radially extending finger between said studs being adjusted by rotation of said eccentric screw head to balance out the backlash in said first and second systems.

4. A mechanical drive system for an indicator comprising the combination of a driven shaft, a gear rotatably supported on said shaft, a pair of abutment surfaces on said gear, at least one of said abutment surfaces being adjustable to change the spacing between said pair of abutment surfaces, and a radially extending member fastened to said shaft positioned for engagement with one or the other of said abutment surfaces depending on the direction of rotation of said shaft.

5. A backlash compensating mechanism comprising in combination, a rotatable control member, a first driven member, a first mechanical driving system having a predetermined backlash characteristic connected between said control member and said first driven member to transmit motion from said control member to said first driven member, a second driven member, a second mechanical driving system having less backlash than said first driving system connected between said control member and said second driven member to transmit motion from said control member to said second driven member, said second mechanical driving system including a shaft and a gear member connected in driving relation in said second mechanical driving system and rotatably supported on said shaft, a pair of axially extending studs mounted in spaced relation on a surface of said gear member, and a radially extending finger fastened to said shaft, said finger extending between said studs whereby rotation of said shaft causes said finger to bear against one of said studs to drive said gear.

6. The combination with a system of the type wherein a common control member is adapted to drive a pair of driven members through respective mechanical driving systems having differing amounts of backlash, of a backlash compensating system for connection in the mechanical driving system having the smaller amount of backlash comprising means for introducing an amount of backlash into said driving system having the smaller amount of backlash which is equal to the difference in the amount of backlash between the two drive systems to provide exact tracking of the driven members for both directions of rotation of said control member.

7. The combination with a system of the type wherein a common control member is adapted to drive a pair of driven members through respective mechanical driving systems having differing amounts of backlash, of a backlash compensating system for connection in the mechanical driving system having the smaller amount of backlash comprising, a first member directly controlled for rotational movement by said common control member, a second member controlled for rotational movement by said first member, means providing a pair of spaced abutment surfaces on one of said members, and means providing an element on the other of said members which is positioned for engagement with said abutment surfaces whereby a predetermined amount of backlash is introduced between said first and second members depending on the spacing between said abutment surfaces.

8. The combination with a system of the type wherein a common control member is adapted to drive a pair of driven members through respective mechanical driving systems having differing amounts of backlash, of a backlash compensating system for connection in the mechanical driving system having the smaller amount of backlash comprising, a first member directly controlled for rotational movement by said common control member, a second member controlled for rotational movement by said first member, means providing a pair of spaced abutment surfaces on one of said members, means providing an element on the other of said members which is positioned for engagement with said abutment surfaces, and means for adjusting the spacing of said abutment surfaces whereby a predetermined amount of backlash is introduced between said first and second members depending on the spacing between said abutment surfaces.

9. The combination with a system of the type wherein a common control member is adapted to drive a pair of driven members through respective mechanical driving systems having differing amounts of backlash, of a backlash compensating system for connection in the mechanical driving system having the smaller amount of backlash comprising, a first member directly controlled for rotational movement by said common control member, a second member controlled for rotational movement by said first member, means providing a pair of spaced abutment surfaces on said second member, means providing an element on said first member which is positioned for engagement with said abutment surfaces, and means for adjusting the spacing of said abutment surfaces whereby a predetermined amount of backlash is introduced between said first and second members depending on the spacing between said abutment surfaces.

10. The combination with a system of the type wherein a common control member is adapted to drive a pair of driven members through respective mechanical driving systems having differing amounts of backlash, of a backlash compensating system for connection in the mechanical driving system having the smaller amount of backlash comprising, a first member directly controlled for rotational movement by said common control member, a second member controlled for rotational movement by said first member, means providing a pair of spaced abutment surfaces on said first member, means providing an element on said second member which is positioned for engagement with said abutment surfaces, and means for adjusting the spacing of said abutment surfaces whereby a predetermined amount of backlash is introduced between said first and second members depending on the spacing between said abutment surfaces.

References Cited in the file of this patent

UNITED STATES PATENTS

| | | |
|---|---|---|
| 669,500 | Andrews | Mar. 12, 1907 |
| 2,576,281 | Carr | Nov. 27, 1951 |